(12) United States Patent
Wang et al.

(10) Patent No.: US 9,193,019 B2
(45) Date of Patent: Nov. 24, 2015

(54) PRESS-FIT ASSEMBLY APPARATUS

(71) Applicant: Wistron Corporation, New Taipei (TW)

(72) Inventors: Chun-Kai Wang, New Taipei (TW); Hsueh-Yen Lai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 214 days.

(21) Appl. No.: 14/144,482

(22) Filed: Dec. 30, 2013

(65) Prior Publication Data

US 2014/0373327 A1  Dec. 25, 2014

(30) Foreign Application Priority Data

Jun. 21, 2013  (CN) .......................... 2013 2 0361839

(51) Int. Cl.
*B23P 19/027* (2006.01)
*B30B 1/38* (2006.01)
*B30B 15/08* (2006.01)
*G02F 1/13* (2006.01)
(Continued)

(52) U.S. Cl.
CPC ................ *B23P 19/027* (2013.01); *B30B 1/38* (2013.01); *B30B 15/08* (2013.01); *G02F 1/1303* (2013.01); *G02F 1/133308* (2013.01); *B29C 65/58* (2013.01); *B29C 66/1142* (2013.01); *B29C 66/1222* (2013.01); *B29C 66/1224* (2013.01); *B29C 66/54* (2013.01); *B29C 66/8161* (2013.01); *B29C 66/81423* (2013.01); *B29C 66/81427* (2013.01); *B29C 66/81463* (2013.01); *B29C 66/8242* (2013.01); *B29C 66/8322* (2013.01); *B29C 66/8362* (2013.01); *B29C 66/8412* (2013.01); *B29C 66/84121* (2013.01); *B29L 2012/00* (2013.01); *G02F 2001/133322* (2013.01); *Y10T 29/5383* (2015.01); *Y10T 29/53961* (2015.01)

(58) Field of Classification Search
CPC ........ B23P 19/02; B23P 19/027; B23P 19/04; B25B 27/02; B29C 65/565; H05K 13/04; Y10T 29/53
See application file for complete search history.

(56) References Cited

U.S. PATENT DOCUMENTS 2,779,590 A * 1/1957 Seastrom ............... B21D 43/06
226/141
3,893,232 A * 7/1975 Fletcher ............. H05K 13/0452
221/95

(Continued)

FOREIGN PATENT DOCUMENTS

TW  201225765 A1  6/2012

*Primary Examiner* — Lee D Wilson
*Assistant Examiner* — Tyrone V Hall, Jr.
(74) *Attorney, Agent, or Firm* — Winston Hsu; Scott Margo

(57) ABSTRACT

A press-fit assembly apparatus for pressing to join two frames includes a base, a moving mechanism, and a rolling-and-pressing device. The base is used for supporting the two frame stacked thereon. The moving mechanism includes a movable mount. The rolling-and-pressing device includes a fixed mount and a roller. The fixed mount is fixed on the movable mount. The roller is connected to the fixed mount. During a movement of the movable mount in a direction relative to the base, the roller can keep moving apart from the base substantially by a distance. Thereby the roller can touch one of the frames corresponding to two engagement portions of the two frames and roll and press the one frame for achieve the purpose of joining the two frames. Therefore, the invention improves the yield of the joining process for the two frames by the above rolling and pressing.

20 Claims, 9 Drawing Sheets

(51) Int. Cl.
  *G02F 1/1333* (2006.01)
  *B29L 12/00* (2006.01)
  *B29C 65/58* (2006.01)
  *B29C 65/00* (2006.01)

(56) References Cited

U.S. PATENT DOCUMENTS

| | | | | |
|---|---|---|---|---|
| 4,316,321 A * | 2/1982 | Wickham | ................ | B23P 19/00 227/136 |
| 4,771,535 A * | 9/1988 | Abe | ................ | B21D 53/26 29/525 |
| 5,176,922 A * | 1/1993 | Balsano | ................ | A21C 11/006 100/237 |
| 5,337,656 A * | 8/1994 | Hollnagel | ................ | B30B 1/003 100/125 |
| 5,619,782 A * | 4/1997 | Tanaka | ................ | B23P 19/102 29/281.4 |
| 7,578,051 B2 * | 8/2009 | Hekman | ................ | B23P 19/02 29/407.09 |
| 2002/0007544 A1 * | 1/2002 | Harada | ................ | B29C 31/00 29/407.1 |
| 2006/0248711 A1 * | 11/2006 | Lu | ................ | H05K 5/0013 29/760 |
| 2007/0056161 A1 * | 3/2007 | Hanaoka | ................ | B23P 19/007 29/718 |
| 2010/0095518 A1 * | 4/2010 | Lee | ................ | H05K 9/0022 29/729 |

* cited by examiner

PRESS-FIT ASSEMBLY APPARATUS

BACKGROUND OF THE INVENTION

1. Field of the Invention

The invention relates to a press-fit assembly apparatus, and especially relates to a press-fit assembly apparatus joining two frames by rolling and pressing.

2. Description of the Prior Art

In a general assembly process of a liquid crystal display monitor, after a display module is assembled to a back casing of the monitor, the back casing needs to be joined with a front frame. If an operator joins the front frame directly to the back casing by hands, because such joining needs the operator to apply a proper force on the front frame and the back casing, the degree of fatigue of the operator increases after a long time operation. The applied force by the operation will be unsteady, leading to failure in the joining. Especially if a displaying panel of the display module is located close to where the back casing and the front frame are joined, the failure in joining may also induce cracks in the displaying panel, which increases the manufacturing cost. In addition, in a method of using fixtures to join the back casing and the front frame, e.g. applying a vertical force directly on the front frame by use of a press plate of the fixture for joining the front frame to the back casing, for completely joining the back casing and the front frame, the press plate of the fixture usually horizontally presses down the front frame in a fixed stroke. The press plate cannot press down in coordination with the actual joining situations of the back casing with the front frame. It leads to that when an inexact alignment of the back casing with the front frame occurs due to operation or manufacturing variation, a direct and vertical pressing by the press plate may induce an incomplete join of the back casing to the front frame or cracks at some joined portions. Furthermore, when the inexact alignment is worse, forcing the press plate to press down may not only damage the back casing or the front frame but also indirectly induce cracks in the displaying panel. For example, a constant stroke may induce an excessive large pressing force of the press plate; a damaged structure of the back casing or the front frame may indirectly induce cracks in the displaying panel.

SUMMARY OF THE INVENTION

The present disclosure provides a press-fit assembly apparatus for pressing to join two frames which are ready to be engaged oppositely. The press-fit assembly apparatus has mechanical stability so that any instability in pressing operation due to human tiredness can be avoided. Furthermore, the press-fit assembly apparatus pressing to join the two frames by rolling and pressing is conducive to achievement of completely joining the two frames.

A press-fit assembly apparatus of the invention is used to press to join a first frame and a second frame. The first frame includes a first engagement portion. The second frame includes a second engagement portion. The first engagement portion corresponds to the second engagement portion. The press-fit assembly apparatus includes a base, a moving mechanism, and a rolling-and-pressing device. The base is used for carrying the first frame and the second frame. Therein, the second frame is stacked on the first frame; the second engagement portion is right opposite to the first engagement portion. The moving mechanism includes a movable mount. The movable mount is capable of moving relative to the base in a direction. The rolling-and-pressing device includes a fixed mount and a roller. The fixed mount is fixed on the movable mount. The roller is connected to the fixed mount. The roller can keep moving apart from the base substantially by a distance during a movement of the first movable mount in the direction. Therein, when the roller touches the second frame corresponding to the second engagement portion, the moving mechanism is capable of being driven to move the movable mount in the direction, so that the roller rolls the second frame corresponding to the second engagement portion in the direction so as to engage the second engagement portion with the first engagement portion. In practice, the distance is substantially equal to the thickness of the first frame and the second frame after being joined. So after the roller rolls, the second engagement portion and the first engagement portion are joined completely. Because the roller rolls the second frame gradually, the roller can adapt to actual joining situations of the second engagement portion to the first engagement portion, so as to join the second engagement portion to the first engagement portion completely. Further, the rolling-and-pressing device further includes an elastic adapting mechanism connecting the fixed mount and the roller so that the roller is capable of elastically touching and rolling the second frame, so as to avoid applying an excessive force to the second engagement portion and the first engagement portion leading to structural damages on the second frame or the first frame, and also to avoid cracks in the displaying panel indirectly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
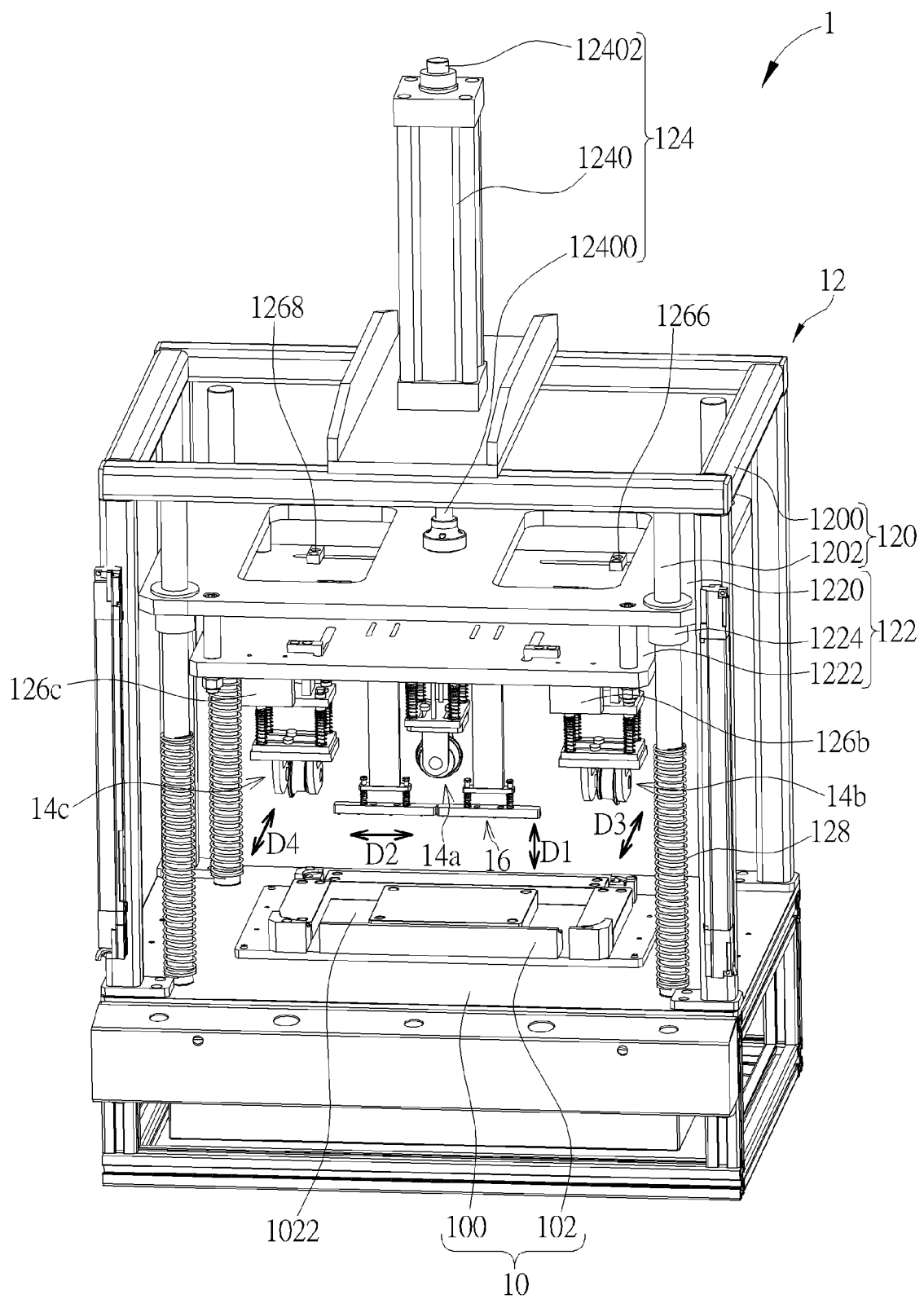
FIG. 1 is a schematic diagram illustrating a press-fit assembly apparatus of a preferred embodiment according to the invention.
Figure 2:
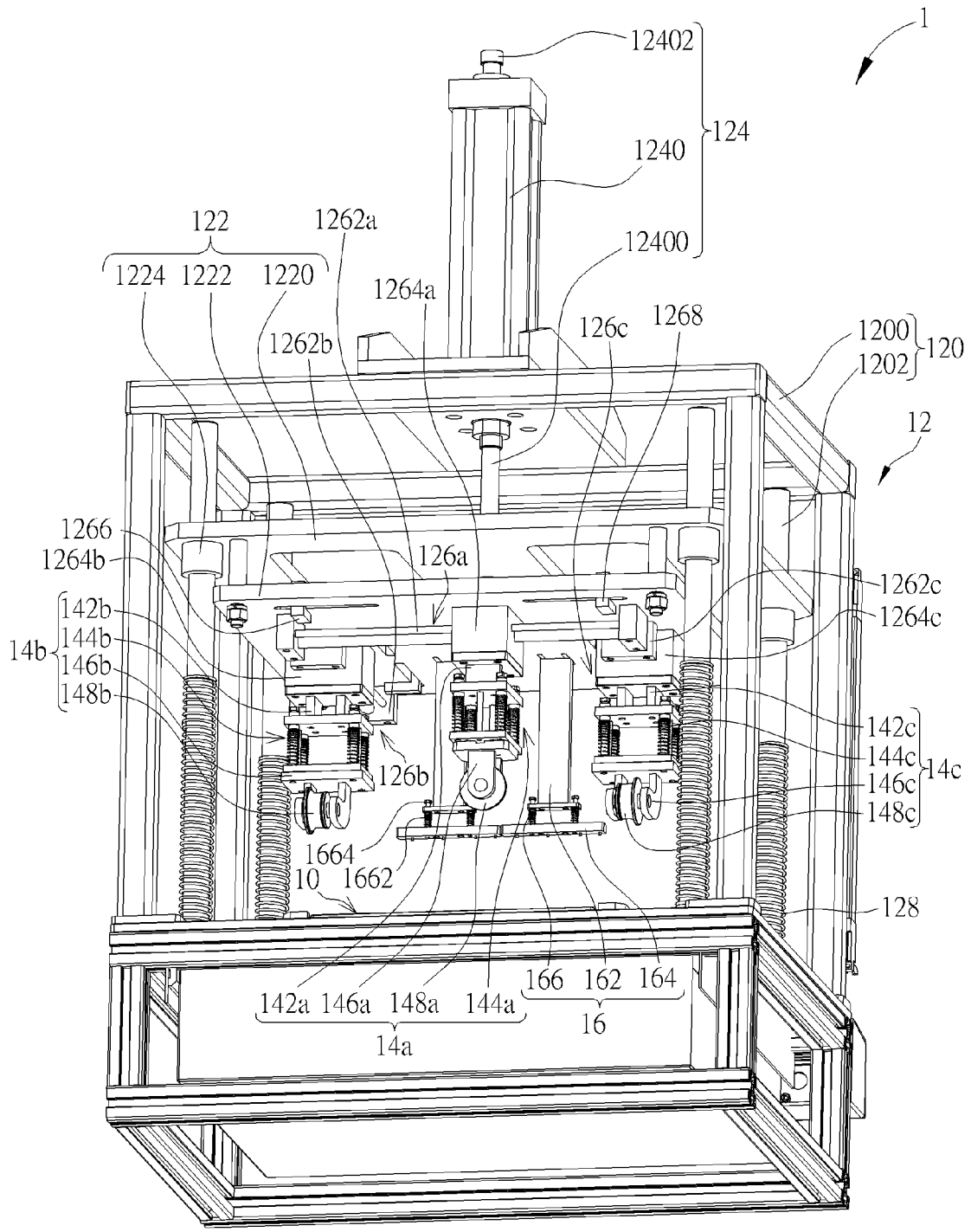
FIG. 2 is a schematic diagram illustrating the press-fit assembly apparatus in FIG. 1 in another view point.

Please refer to FIG. 1 and FIG. 2. FIG. 1 is a schematic diagram illustrating a press-fit assembly apparatus 1 of a preferred embodiment according to the invention. FIG. 2 is a schematic diagram illustrating the press-fit assembly apparatus 1 in another view point. The press-fit assembly apparatus 1 includes a base 10, a moving mechanism 12, a first, a second and a third rolling-and-pressing devices 14a, 14b and 14c, and a vertical pressing device 16. The moving mechanism 12 is disposed on the base 10 for driving the first, the second and the third rolling-and-pressing devices 14a, 14b and 14c and the vertical pressing device 16 to move horizontally and vertically relative to the base 10. For more details, the base 10 includes a platform 100 and a fixture 102 disposed on the platform 100. The moving mechanism 12 includes a supporting frame assembly 120, a slidable mount 122, a slidable mount driving device 124, and a first, a second and a third movable mount driving devices 126a, 126b and 126c. The supporting frame assembly 120 includes a fixed frame 1200 and four guiding columns 1202, which all are fixed on the platform 100. The slidable mount 122 is slidably disposed on the supporting frame assembly 120 substantially opposite to the fixture 102. The slidable mount 122 includes a slidable plate 1220, a supporting plate 1222, and four bushings 1224. The supporting plate 1222 is connected to the slidable plate 1220 with an interval by a plurality of bolts and spacing bushings, which facilitates attachment of other components onto the slidable plate 1220 and the supporting plate 1222. The four bushings 1224 are fixed on the slidable plate 1220 and sleeved on the guiding columns 1202; that is, the guiding columns 1202 are disposed to pass through the slidable mount 122, so that the slidable plate 1220 together with the supporting plate 1222 can slide on the guiding columns 1202, i.e. the slidable mount 122 being capable of moving relative to the base 10 stably. In the embodiment, the slidable mount 122 also includes four springs 128 movably sleeved on the guiding columns 1202 respectively between the corresponding bushings 1224 and the platform 100. The bushings 1224 compress the springs 128 when the slidable plate 1220 moves toward the base 10, which produces cushioning effect. The disposition quantity of the guiding columns 1202 and the bushings 1224 is not limited thereto. The slidable mount driving device 124 includes a pneumatic cylinder 1240 fixed on the fixed frame 1200. The pneumatic cylinder 1240 includes a piston rod 12400 and a stroke adjustment nut 12402. An end of the piston rod 12400 is connected to the slidable plate 1220. By controlling movement of the pneumatic cylinder 1240, the slidable plate 1220 (or the slidable mount 122) can be driven by the piston rod 12400 to move on the guiding columns 1202 in a vertical direction D1 toward or away from the base 10. The stroke adjustment nut 12402 is used for adjusting the stroke of the piston rod 12400. Other descriptions about the action of the pneumatic cylinder 1240 are known by skilled persons in the art and will not be described herein.

The first, the second and the third movable mount driving devices 126a, 126b and 126c are disposed on the slidable mount 122. The first, the second and the third movable mount driving devices 126a, 126b and 126c include a first, a second and a third slide cylinders 1262a, 1262b and 1262c respectively. The first, the second and the third slide cylinders 1262a, 1262b and 1262c are fixed on the supporting plate 1222 and include a first, a second and a third movable mounts 1264a, 1264b and 1264c respectively. The first, the second and the third slide cylinders 1262a, 1262b and 1262c can be individually operated to drive the first, the second and the third movable mounts 1264a, 1264b and 1264c to move in horizontal directions D2, D3 and D4 respectively. In the embodiment, the horizontal directions D3 and D4 are parallel, but the invention is not limited thereto. For convenient illustration, in the embodiment, the first, the second and the third movable mount driving devices 126a, 126b and 126c are designed by the same logic, but the invention is not limited thereto. In the following, the descriptions about the first, the second and the third movable mount driving devices 126a, 126b and 126c can refer to each other; they will not be repeated. It is added that in the first movable mount driving device 126a, for example, in principle, two fixed ends at two sides of the first slide cylinder 1262a have an effect of confining the slide stroke in the horizontal direction D2 of the first movable mount 1264a. However, in the embodiment, the first movable mount driving device 126a further includes two limit blocks 1266 and 1268 adjustably disposed on the supporting plate 1222 so that the first movable mount 1264a is confined to move between the two limit blocks 1266 and 1268, so as to achieve the purpose of adjusting the slide stroke in the horizontal direction D2 of the first movable mount 1264a.

Figure 3:
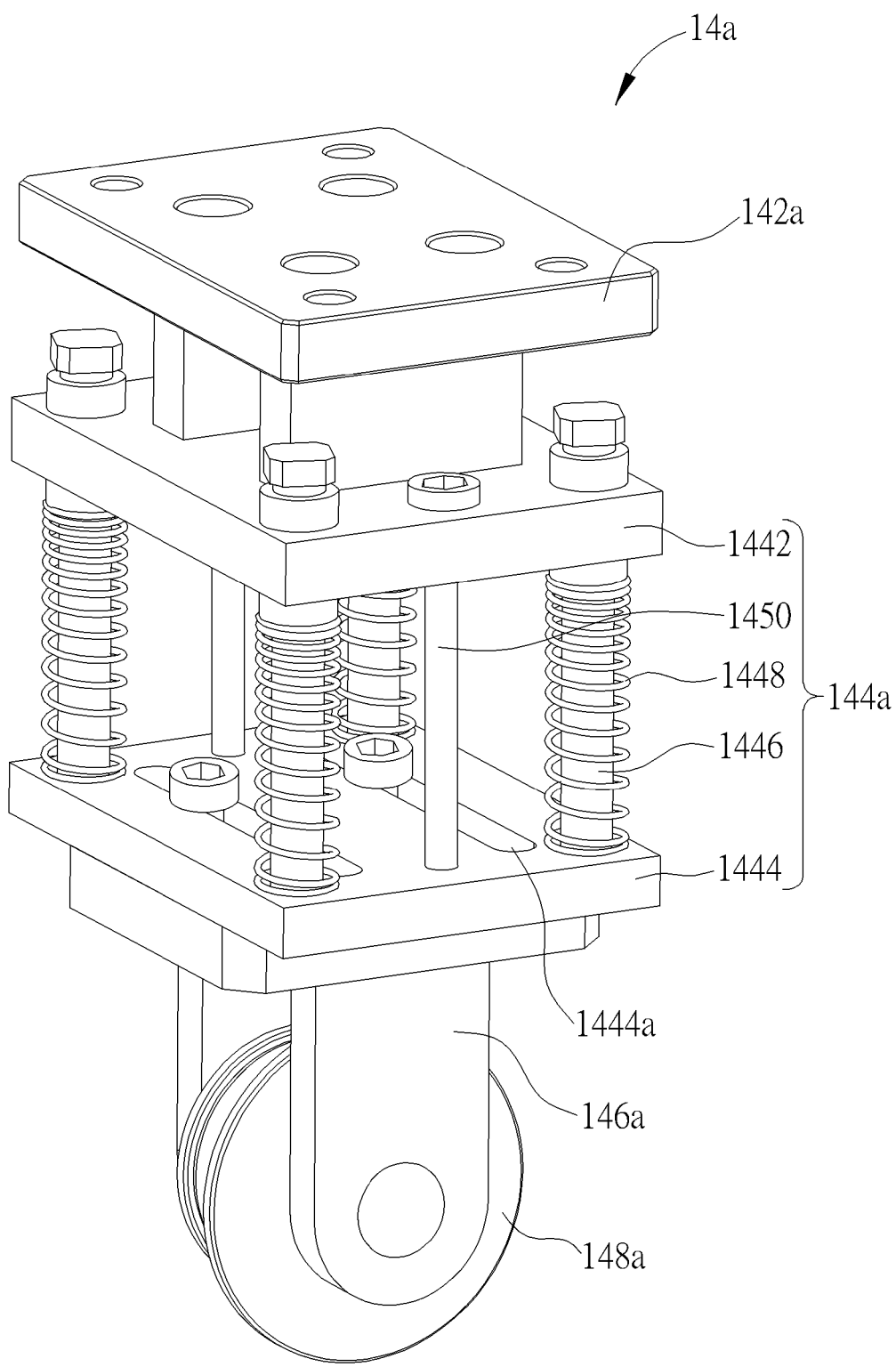
FIG. 3 is a schematic diagram illustrating a first rolling-and-pressing device of the press-fit assembly apparatus in FIG. 1.
Figure 4:
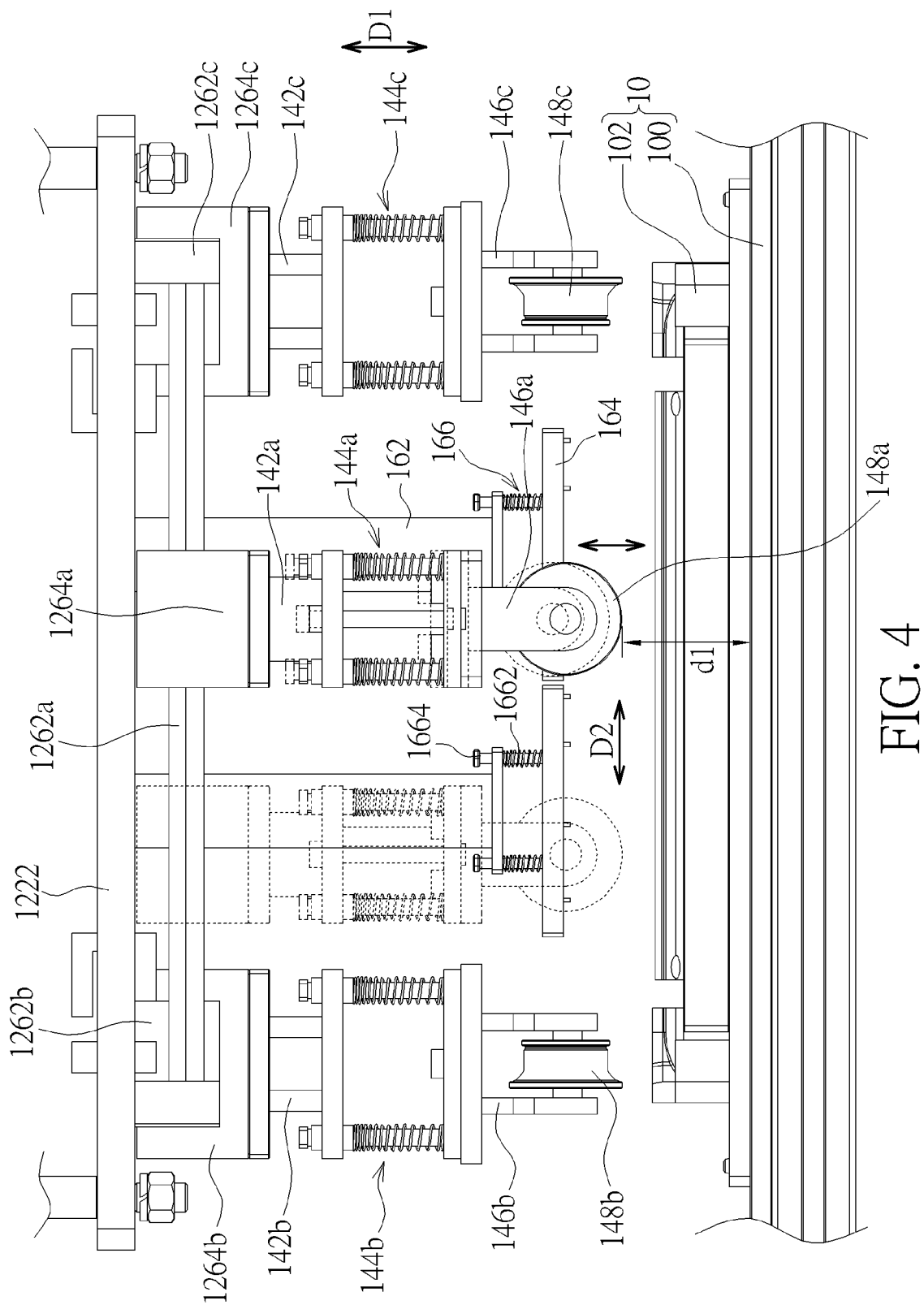
FIG. 4 is a side view of a portion of the press-fit assembly apparatus in FIG. 1.

The first, the second and the third rolling-and-pressing devices 14a, 14b and 14c include a first, a second and a third fixed mounts 142a, 142b and 142c, a first, a second and a third elastic adapting mechanisms 144a, 144b and 144c, a first, a second and a third roller supports 146a, 146b and 146c, and a first, a second and a third rollers 148a, 148b and 148c respectively. Similarly, for convenient illustration, in the embodiment, the first, the second and the third rolling-and-pressing devices 14a, 14b and 14c have the same structural design, excluding the first roller support 146a; however, the invention is not limited thereto. In the embodiment, the second and the third roller supports 146b and 146c are provided in a form of L-shaped structure to be pivotally connected to the second and the third rollers 148b and 148c. In the following, the descriptions about the first, the second and the third rolling-and-pressing devices 14a, 14b and 14c can refer to each other; they will not be repeated. Please refer to FIG. 3 and FIG. 4. FIG. 3 is a schematic diagram illustrating the first rolling-and-pressing device 14a. FIG. 4 is a side view of a portion of the press-fit assembly apparatus 1. In the first rolling-and-pressing device 14a, for example, the first fixed mount 142a is fixed on the first movable mount 1264a. The first roller 148a is pivotally connected to the first roller support 146a. The first roller support 146a is connected through the first elastic adapting mechanism 144a to the first fixed mount 142a, so that when in use, the first roller 148a is capable of vertically moving relative to the first fixed mount 142a. Thereby, the first slide cylinder 1262a can drive the first fixed mount 142a through the first movable mount 1264a to move relative to the slidable mount 122 in the horizontal direction D2, so that the first roller 148a can keep moving in the horizontal direction D2 apart from the base 10 (or the platform 100) substantially by a distance.

In the embodiment, the first elastic adapting mechanism 144a includes an upper connection board 1442, a lower connection board 1444, four guiding columns 1446, and four resilient parts 1448 (e.g. springs). The upper connection board 1442 is fixed on the first fixed mount 142a. The lower connection board 1444 is fixed on the first roller support 146a. The guiding columns 1446 are fixed on the lower connection board 1444. The upper connection board 1442 is slidably sleeved on the guiding columns 1446. The resilient parts 1448 are disposed between the upper connection board 1442 and the lower connection board 1444 and sleeved on the guiding columns 1446 correspondingly, so that the upper connection board 1442 and the lower connection board 1444 (or the first fixed mount 142a and the first roller support 146a) are capable of approaching each other by the guiding columns 1446 to compress the resilient parts 1448. The disposition quantity of the guiding columns 1446 and the resilient parts 1448 is not limited thereto. Besides, the invention is not limited to that the resilient parts 1448 are sleeved on the guiding columns 1446. In the embodiment, the resilient parts 1448 are compressed in advance and disposed between the upper connection board 1442 and the lower connection board

Figure 5:
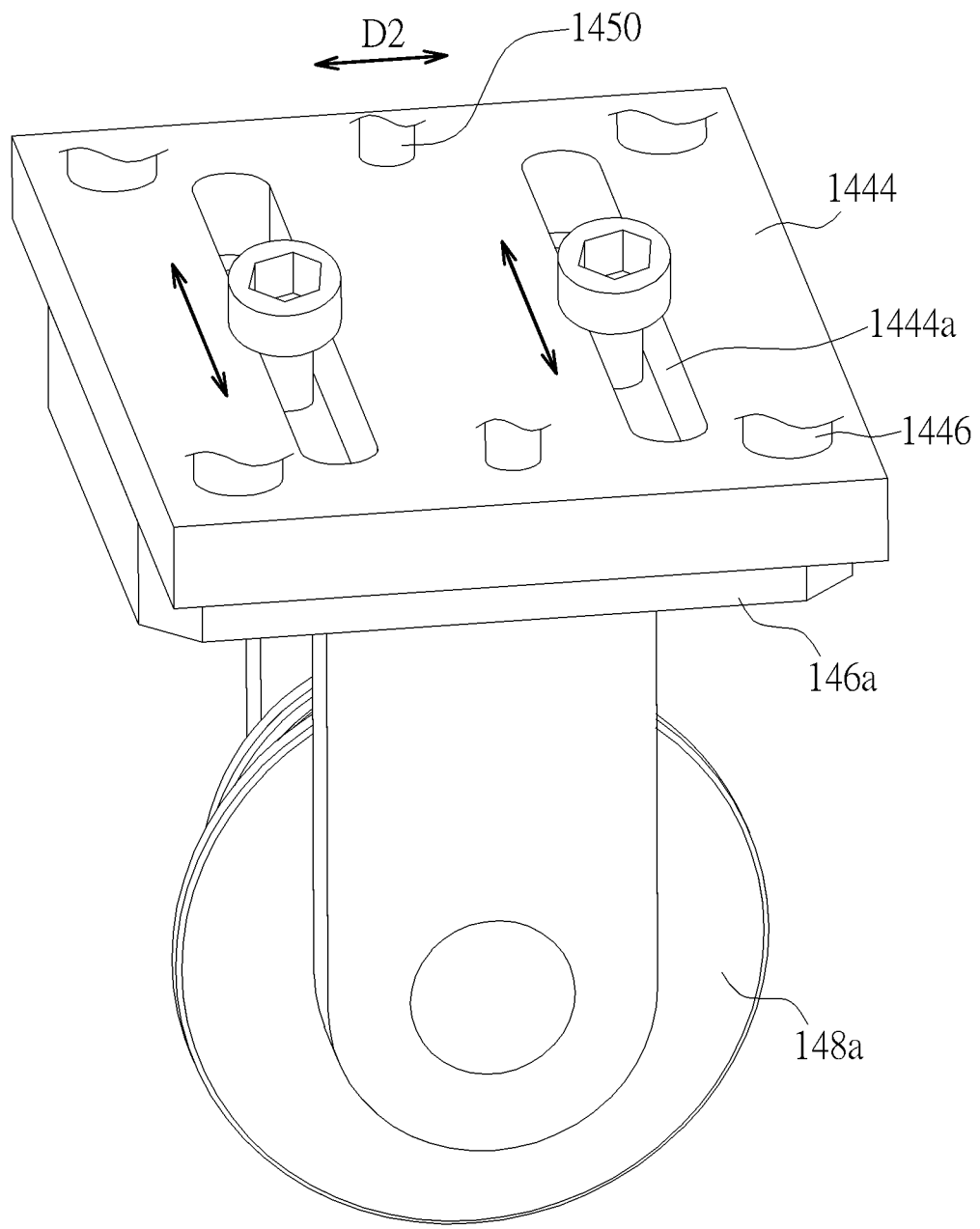
FIG. 5 is a schematic diagram illustrating a portion of the first rolling-and-pressing device of the press-fit assembly apparatus in FIG. 1.

1444. The compression quantity in advance can be adjusted by adjusting bolts 1450. The bolts 1450 also can be used for adjusting an initial interval between the upper connection board 1442 and the lower connection board 1444 (i.e. a maximum distance between the upper connection board 1442 and the lower connection board 1444). It is added that in practice, when the first roller 148a moves in the horizontal direction D2, a distance dl from the first roller 148a to the base 10 can be adjusted not only by adjusting the stroke of the piston rod 12400 (e.g. by adjusting the stroke adjustment nut 12402) or but also by adjusting the bolts 1450 respectively. In addition, please refer FIG. 5 which is a schematic diagram illustrating a portion of the first rolling-and-pressing device 14a. The lower connection board 1444 has two slots 1444a extending perpendicular to the horizontal direction D2. A relative position of the first roller support 146a fixedly connected to the lower connection board 1444 can be adjusted by attaching the first roller support 146a to the slots 1444a in different locations. Similarly, by the same adjustment mechanism, relative positions of the second and the third roller supports 146b and 146c to the second and the third elastic adapting mechanism 144b and 144c also can be adjusted in the horizontal directions D2 and D3 respectively.

Please refer back to FIG. 1 and FIG. 2. The vertical pressing device 16 includes a connection part 162, a pressing part 164, and an elastic adapting mechanism 166. The connection part 162 is fixed on the supporting plate 1222. The pressing part 164 is connected through the elastic adapting mechanism 166 to the connection part 162 so as to elastically and vertically move relative to the connection part 162. In the embodiment, the elastic adapting mechanism 166 includes two resilient parts 1662 (e.g. springs) and two bolts 1664. The resilient parts 1662 are compressed in advance and disposed between the connection part 162 and the pressing part 164. The two bolts 1664 pass through the resilient parts 1662 respectively and are connected to the connection part 162 and the pressing part 164 so that the pressing part 164 is capable of moving up and down stably by use of the bolts 1664. Besides, the bolts 1664 are also conducive to the movement stability of the resilient part 1662. Furthermore, the bolts 1664 also can be used for adjusting an initial interval between the connection part 162 and the pressing part 164 (i.e. a maximum distance between the connection part 162 and the pressing part 164). In addition, in the embodiment, the press-fit assembly apparatus 1 has two sets of the vertical pressing device 16, but the invention is not limited thereto.

Figure 6:
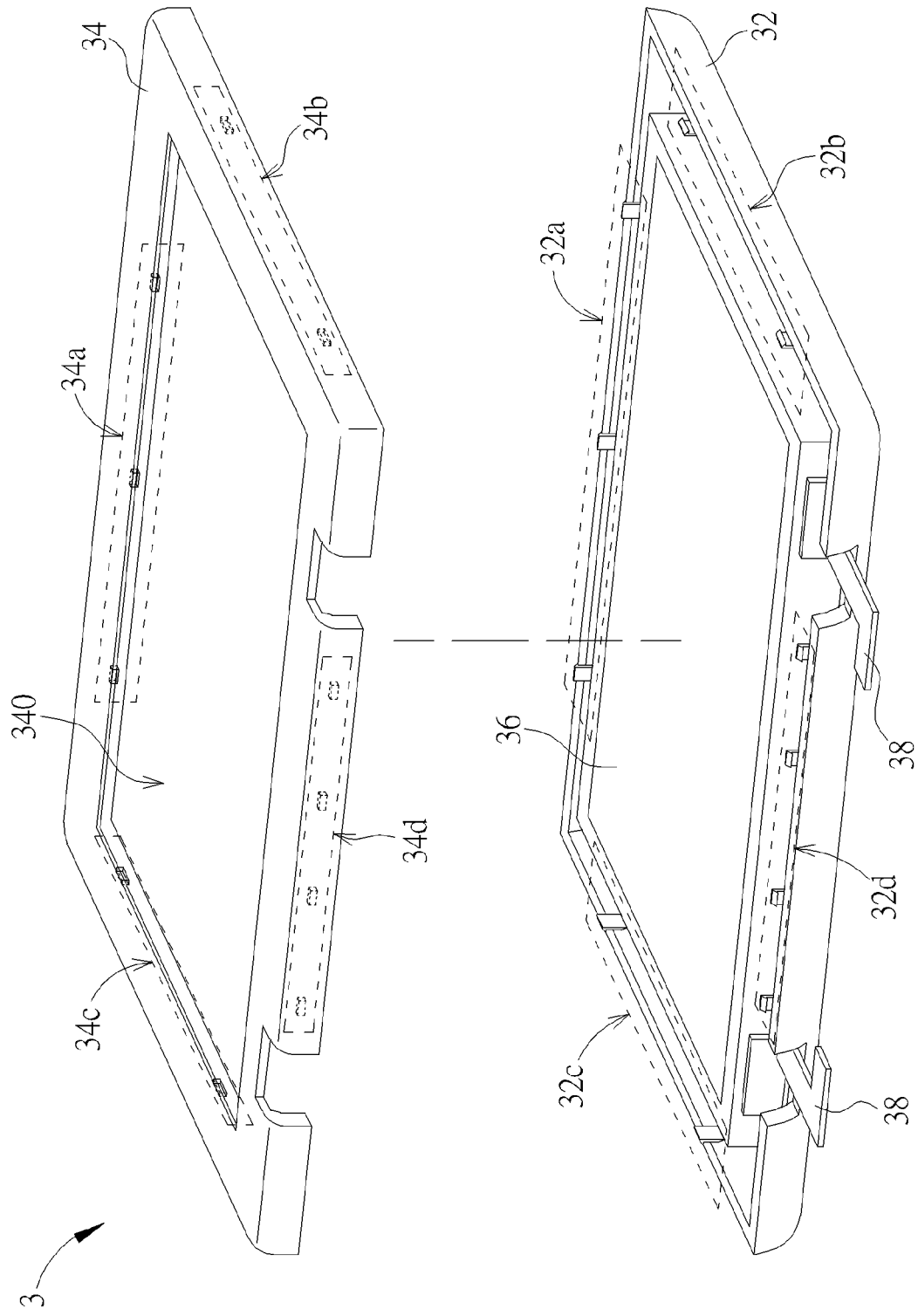
FIG. 6 is a partially exploded view of an electronic apparatus.

Please refer to FIG. 6, which is a partially exploded view of an electronic apparatus 3. In the embodiment, the electronic apparatus 3 is a monitor of a notebook, but the invention is not limited thereto. The electronic apparatus 3 includes a first frame 32 and a second frame 34. The first frame 32 accommodates a displaying panel 36 and two hinge components 38 inside. Therein, the hinge components 38 also protrude out the first frame 32. The second frame 34 is a rectangular frame substantially, which has a window 340 formed at the middle portion such that the displaying panel 36 can be exposed through the window 340 after the second frame 34 and the first frame 32 are joined. The first frame 32 has four engagement portions 32a, 32b, 32c and 32d (indicated by dashed frames) formed at four sides thereof respectively. Each of the engagement portions 32a, 32b, 32c and 32d has a plurality of hooks. Correspondingly, the second frame 34 has four engagement portions 34a, 34b, 34c and 34d (indicated by dashed frames) formed at four sides thereof respectively. Each of the engagement portions 34a, 34b, 34c and 34d has a plurality of slots (shown by hidden lines).

Figure 7:
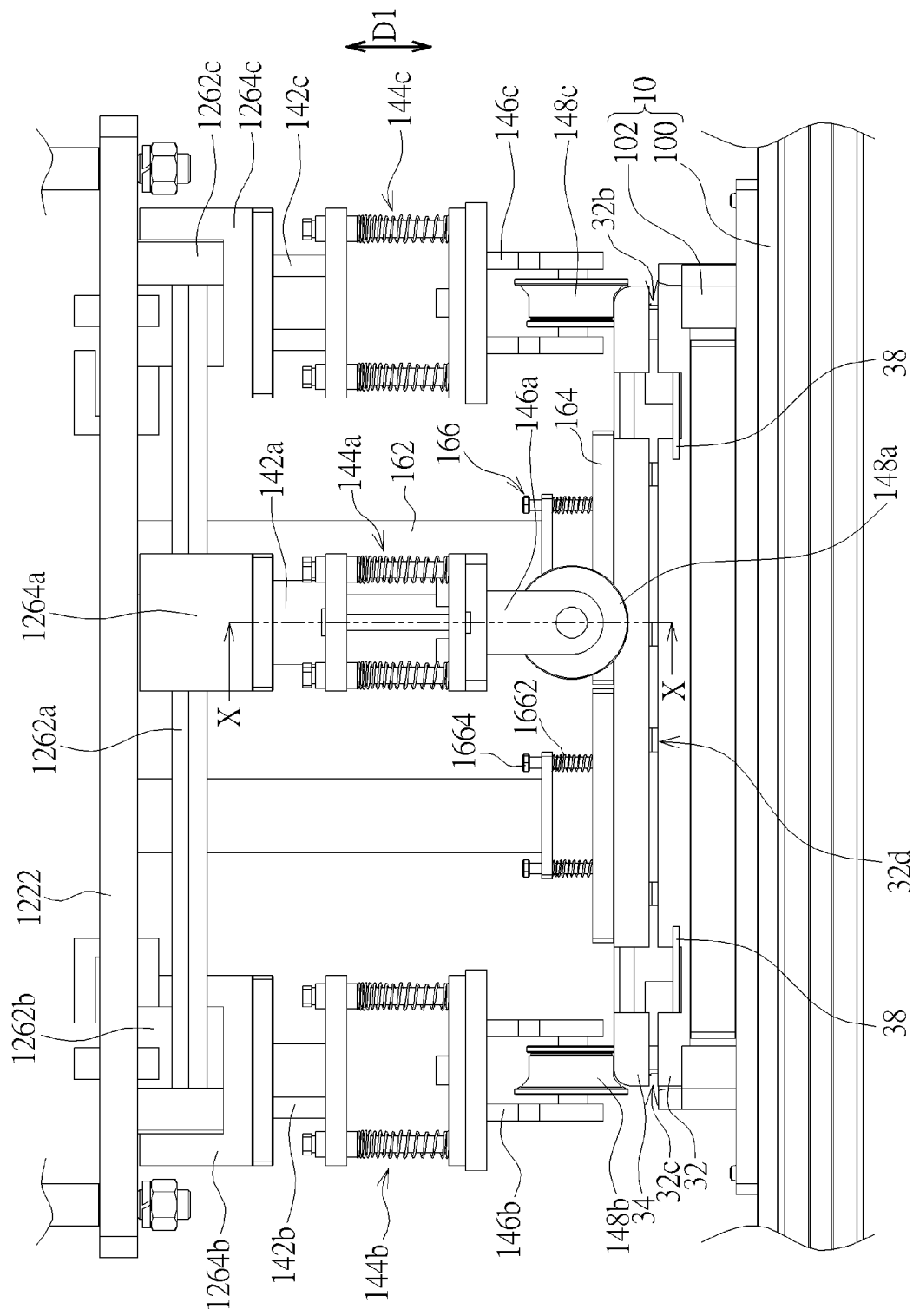
FIG. 7 is a side view of a portion of the press-fit assembly apparatus in FIG. 1 after a first frame and a second frame of the electronic apparatus in FIG. 6 are placed thereon.

Using the press-fit assembly apparatus 1 of the invention for pressing to join the first frame 32 and the second frame 34 needs stacks the first frame 32 and the second frame 34 on the base 10 such that the engagement portions 34a, 34b, 34c and 34d of the second frame 34 can be disposed right opposite to the engagement portions 32a, 32b, 32c and 32d of the first frame 32 correspondingly. Please also refer to FIG. 1. The fixture 102 is used for providing fixing and supporting to the first frame 32. In the embodiment, the fixture 102 is provided by a profile imitation design. The fixture 102 has an accommodating structure 1022 matching the profile of the first frame 32. For example, the border of the accommodating structure 1022 also can be formed to be an arc surface matching the outer arc surface of the first frame 32, so that the fixture 102 can be carried and accommodated stably by the accommodating structure 1022. Please refer to FIG. 1 and FIG. 7. FIG. 7 is a side view of a portion of the press-fit assembly apparatus 1 after the first frame 32 and the second frame 34 are placed in order on the fixture 102. After the first frame 32 and the second frame 34 are placed on the fixture 102, the engagement portions 34a, 34b, 34c and 34d of the second frame 34 are right opposite to the engagement portion 32a, 32b, 32c and 32d of the first frame 32. Afterwards, the press-fit assembly apparatus 1 can be operated to make the slidable mount driving device 124 drive the slidable mount 122 to move toward the base 10 in the vertical direction D1. The first, the second and the third rolling-and-pressing devices 14a, 14b and 14c and the vertical pressing device 16 then move toward the fixture 102 until the first, the second and the third rollers 148a, 148b and 148c and the pressing part 164 touch the second frame 34. In the embodiment, the first, the second and the third rollers 148a, 148b and 148c simultaneously touch the second frame 34 substantially, so that the second frame 34 can be forced in balance in the following pressing process; however, the invention is not limited thereto. Furthermore, the engagement of the engagement portion 34d of the second frame 34 with the engagement portion 32d of the first frame 32 is not performed by rolling, so when the vertical pressing device 16 moves down, the pressing part 164 directly presses the second frame 34 to engage the engagement portion 34d with the engagement portion 32d. The design facilitates the engagement of the engagement portion 34d and the engagement portion 32d located at the same side as the hinge components 38, but the invention is not limited thereto. Afterwards, the first, the second and the third movable mount driving devices 126a, 126b and 126c can be individually driven to drive the first, the second and the third movable mounts 1264a, 1264b and 1264c to roll the second frame 34 in the horizontal directions D2, D3 and D4 respectively, so as to engage the engagement portions 34a, 34b and 34c of the second frame 34 with the engagement portion 32a, 32b and 32c of the first frame 32 respectively.

Furthermore, though the first, the second and the third rollers 148a, 148b and 148c and the pressing part 164 all are disposed on the slidable mount 122, in practice, differences among the required forces for pressing by the first, the second and the third rollers 148a, 148b and 148c and the pressing part 164 can be coordinated by designing the elastic constants of the resilient parts 1448 and 1662, so that the engagement portions 32a, 32b and 32c and the engagement portions 34a, 34b and 34c can be engaged under proper forces. It can be achieved easily by a skilled person according to the above description and will not be described herein. In addition, in the embodiment, in the rolling process of the first, the second and the third rollers 148a, 148b and 148c, the engagement portion 34d and the engagement portion 32d has been engaged, but the invention is not limited thereto. For example, the first, the second and the third rollers 148a, 148b and 148c roll the second frame 34 to engage the engagement portions 32a, 32b and 32c with the engagement portions 34a, 34b and 34c prior to the engagement of the engagement portion 32d with the engagement portion 34d (e.g. by further moving the slidable mount 122 toward the base 10). It also can be performed by designing the elastic constants of the resilient parts 1448 and 1662 and will not be described herein. In this example, when the first, the second and the third rollers 148a, 148b and 148c roll, the pressing part 164 can touch the second frame 34 in advance. It is conducive to fixing the second frame 34 relative to the first frame 32.

It is added that the elastic adapting mechanisms 144a, 144b, 144c and 166 can make the first, the second and the third rollers 148a, 148b and 148c and the pressing part 164 be able to elastically touch and roll the second frame 34, so as to avoid damages on the second frame 34 and even cracks in the displaying panel 36 due to excessive loaded forces. For example, the action of the pneumatic cylinder 1240 is so unstable that the dead point of the piston rod 12400 varies, or the alignment of the engagement portions 34a, 34b, 34c and 34d with the engagement portions 32a, 32b, 32c and 32d is so poor that the second frame 34 is obliquely disposed on the first frame 32. Furthermore, the first, the second and the third rollers 148a, 148b and 148c roll to engage each pair of the hook and the slot one by one, so the inter-effect among the engagements of each pair of the hook and the slot can be reduced greatly so that each pair of the hook and the slot can be engaged substantially independently and stably.

Figure 8:
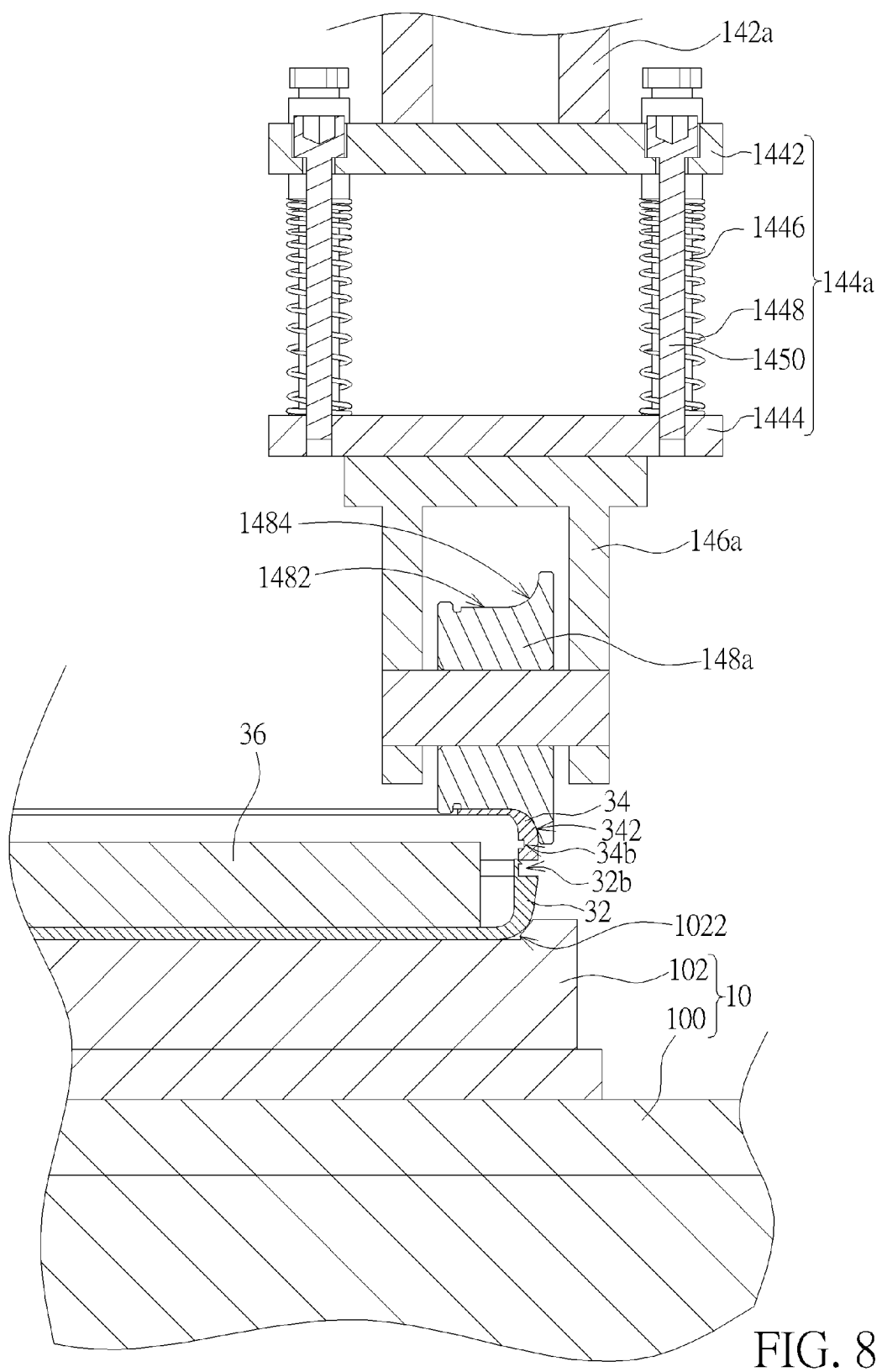
FIG. 8 is a sectional view of the first roller touching the second frame along the line X-X in FIG. 7.

Please refer to FIG. 3 and FIG. 8. FIG. 8 is a sectional view of the first roller 148a touching the second frame 34; therein, the position of the cutting plane thereof is indicated by the line X-X in FIG. 7. It is added that, in the embodiment, the first roller 148a also is provided by a profile imitation design and has a circumferential surface 1482 and a radial sidewall surface 1484, but the invention is not limited thereto. When the first roller 148a rolls the second frame 34, the circumferential surface 1482 rolling touches the second frame 34, and the radial sidewall surface 1484 urges against a side surface 342 of the second frame 34. The first roller 148a has an arc sectional profile, formed by the circumferential surface 1482 and the radial sidewall surface 1484, matching the surface profile (e.g. fillet surface) of the second frame 34 corresponding to the engagement portion 34a, so that the first roller 148a can touch the second frame 34 closely, which is conducive to the stability of the first roller 148a rolling the second frame 34 and also to the alignment of the second frame 34 with the first frame 32. It is added that, in another embodiment, the upper surface of the second frame 34 corresponding to the engagement portion 34a may be an approximately right-angled surface. In such case, the circumferential surface 1482 and the radial sidewall surface 1484 form an L-shaped sectional profile correspondingly. In another embodiment, the circumferential surface 1482 and the radial sidewall surface 1484 may form a sectional profile in other forms corresponding to the surface of the second frame 34 corresponding to the engagement portion 34a. The above descriptions are also applicable to the second and the third rollers 148b and 148c and will not repeated for the second and the third rollers 148b and 148c in addition.

Figure 9:
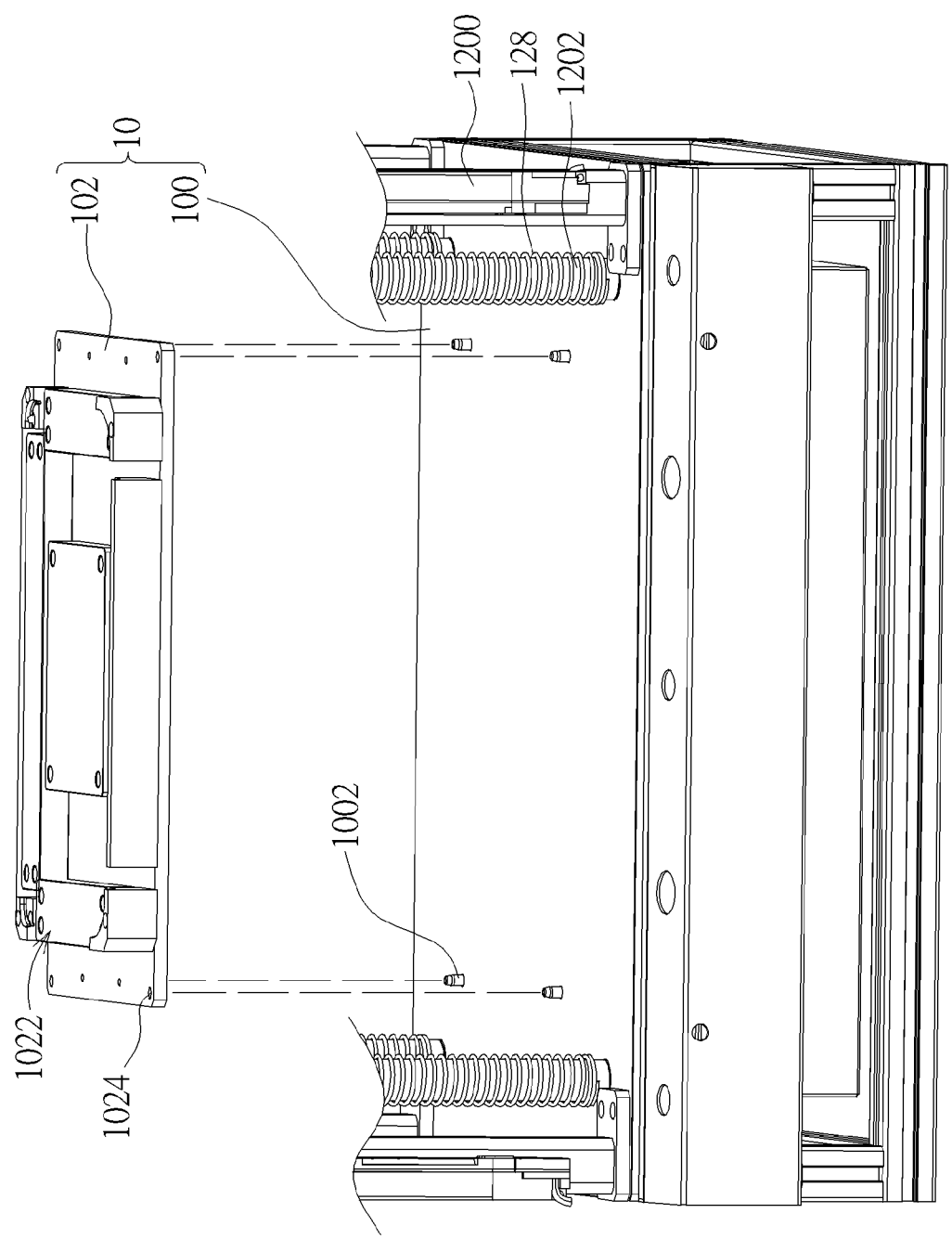
FIG. 9 is a partially exploded view of a base of the press-fit assembly apparatus in FIG. 1.

Please refer to FIG. 9, which is a partially exploded view of the base 10. In the embodiment, the fixture 102 is designed to be detachable. The platform 100 has a positioning structure 1002 (e.g. four positioning pins). The fixture 102 has a positioning structure 1024 (e.g. positioning holes) correspondingly, matching the positioning structure 1002 of the platform 100. By matching the positioning structures 1002 and 1024 with each other, the fixture 102 can be detachably and precisely disposed on the platform 100. Therefore, in actual applications, many kinds of the fixture 102 can be prepared for being using in coordination with different electronic apparatuses 3. It is added that the above matching structure for matching the positioning structure 1002 with the positioning structure 1024 of the invention is not limited to the embodiment. For example, the platform 100 thereon may form a slot regarded as the positioning structure 1002. The fixture 102 can be directly embedded thereto, so that the body profile of the fixture 102 is regarded as the positioning structure 1024.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A press-fit assembly apparatus for pressing to join a first frame and a second frame, the first frame comprising a first engagement portion, the second frame comprising a second engagement portion, the first engagement portion corresponding to the second engagement portion, the press-fit assembly apparatus comprising:
   a base for carrying the first frame and the second frame, wherein the second frame is stacked on the first frame, and the second engagement portion is right opposite to the first engagement portion;
   a moving mechanism comprising a first movable mount, the first movable mount being capable of moving relative to the base in a first direction; and
   a first rolling-and-pressing device comprising a first fixed mount and a first roller, the first fixed mount being fixed on the first movable mount, the first roller being connected to the first fixed mount, the first roller being able to keep moving apart from the base substantially by a distance during a movement of the first movable mount in the first direction, wherein when the first roller touches the second frame corresponding to the second engagement portion, the moving mechanism is capable of being driven to move the first movable mount in the first direction, so that the first roller rolls the second frame corresponding to the second engagement portion in the first direction so as to engage the second engagement portion with the first engagement portion.

2. The press-fit assembly apparatus of claim 1, wherein the moving mechanism comprises a supporting frame assembly, a slidable mount, a slidable mount driving device, and a first movable mount driving device, the supporting frame assembly is fixed on the base, the slidable mount is slidably disposed on the supporting frame assembly, the first movable mount driving device is disposed on the slidable mount for driving the first movable mount to move in the first direction, and the slidable mount driving device is disposed on the supporting frame assembly and connected to the slidable mount for driving the slidable mount to move close to or away from the base in a second direction, so that the first roller is capable of touching the second frame.

3. The press-fit assembly apparatus of claim 2, wherein the supporting frame assembly comprises a plurality of guiding columns passing through the slidable mount, the slidable mount driving device comprises a pneumatic cylinder fixed on the supporting frame assembly, the pneumatic cylinder comprises a piston rod connected to the slidable mount, and the pneumatic cylinder drives the slidable mount by the piston rod to slide on the guiding columns in the second direction.

4. The press-fit assembly apparatus of claim 3, wherein the first movable mount driving device comprises a first slide cylinder fixed on the slidable mount, the first slide cylinder comprises the first movable mount, and the first slide cylinder drives the first fixed mount by the first movable mount to move relative to the slidable mount in the first direction.

5. The press-fit assembly apparatus of claim 4, wherein the first movable mount driving device comprises two limit blocks adjustably disposed on the slidable mount, and the first movable mount is confined to be capable of moving between the two limit blocks.

6. The press-fit assembly apparatus of claim 5, the first frame comprising a third engagement portion, the second frame comprising a fourth engagement portion, the third engagement portion being right opposite to the fourth engagement portion, the press-fit assembly apparatus further comprising a second rolling-and-pressing device, the second rolling-and-pressing device comprising a second fixed mount and a second roller, the second roller being connected to the second fixed mount, the moving mechanism further comprising a second movable mount driving device, the second movable mount driving device comprising a second slide cylinder fixed on the slidable mount, the second slide cylinder comprising a second movable mount, the second fixed mount is fixed on the second movable mount, the second slide cylinder driving the second fixed mount by the second movable mount to move relative to the slidable mount in a third direction with the second roller keeping moving apart from the base substantially by a distance, the slidable mount driving device being capable of driving the slidable mount to move close to the base in the second direction, such that the first roller and the second roller are capable of touching the second frame at the same time, wherein when the second roller touches the second frame corresponding to the fourth engagement portion, the second rolling-and-pressing device is capable of being driven by the moving mechanism so that the second roller rolls the second frame corresponding to the fourth engagement portion in the third direction so as to engage the fourth engagement portion with the third engagement portion.

7. The press-fit assembly apparatus of claim 6, the first frame comprising a fifth engagement portion, the second frame comprising a sixth engagement portion, the fifth engagement portion being right opposite to the sixth engagement portion, the press-fit assembly apparatus further comprising a vertical pressing device, the vertical pressing device comprising a connection part, a pressing part, and an elastic adapting mechanism, the connection part being fixed on the slidable mount, the pressing part being connected by the elastic adapting mechanism to the connection part so as to be capable of elastically moving relative to the connection part, the slidable mount driving device being capable of driving the slidable mount to move close to the base in the second direction, so that the pressing part is capable of pressing the second frame to engage the sixth engagement portion with the fifth engagement portion.

8. The press-fit assembly apparatus of claim 2, wherein the first movable mount driving device comprises a first slide cylinder fixed on the slidable mount, the first slide cylinder comprises the first movable mount, and the first slide cylinder drives the first fixed mount by the first movable mount to move relative to the slidable mount in the first direction.

9. The press-fit assembly apparatus of claim 8, wherein the first movable mount driving device comprises two limit blocks adjustably disposed on the slidable mount, and the first movable mount is confined to move between the two limit blocks.

10. The press-fit assembly apparatus of claim 9, the first frame comprising a third engagement portion, the second frame comprising a fourth engagement portion, the third engagement portion being right opposite to the fourth engagement portion, the press-fit assembly apparatus further comprising a second rolling-and-pressing device, the second rolling-and-pressing device comprising a second fixed mount and a second roller, the second roller being connected to the second fixed mount, the moving mechanism further comprising a second movable mount driving device, the second movable mount driving device comprising a second slide cylinder fixed on the slidable mount, the second slide cylinder comprising a second movable mount, the second fixed mount is fixed on the second movable mount, the second slide cylinder driving the second fixed mount by the second movable mount to move relative to the slidable mount in a third direction with the second roller keeping moving apart from the base substantially by a distance, the slidable mount driving device being capable of driving the slidable mount to move close to the base in the second direction, such that the first roller and the second roller are capable of touching the second frame at the same time, wherein when the second roller touches the second frame corresponding to the fourth engagement portion, the second rolling-and-pressing device is capable of being driven by the moving mechanism so that the second roller rolls the second frame corresponding to the fourth engagement portion in the third direction so as to engage the fourth engagement portion with the third engagement portion.

11. The press-fit assembly apparatus of claim 2, the first frame comprising a fifth engagement portion, the second frame comprising a sixth engagement portion, the fifth engagement portion being right opposite to the sixth engagement portion, the press-fit assembly apparatus further comprising a vertical pressing device, the vertical pressing device comprising a connection part, a pressing part, and an elastic adapting mechanism, the connection part being fixed on the slidable mount, the pressing part being connected by the elastic adapting mechanism to the connection part so as to be capable of elastically moving relative to the connection part, the slidable mount driving device being capable of driving the slidable mount to move close to the base in the second direction, so that the pressing part is capable of pressing the second frame to engage the sixth engagement portion with the fifth engagement portion.

12. The press-fit assembly apparatus of claim 1, wherein the first rolling-and-pressing device comprises an elastic adapting mechanism and a roller support, the first roller is pivotally connected to the roller support, and the roller support is connected by the elastic adapting mechanism to the first fixed mount, so that the first roller is capable of elastically touching and rolling the second frame.

13. The press-fit assembly apparatus of claim 12, wherein the elastic adapting mechanism comprises an upper connection board, a lower connection board, a plurality of guiding columns, and a plurality of resilient parts, the upper connection board is fixed on the first fixed mount, the lower connection board is fixed on the roller support, the guiding columns connect the upper connection board and the lower connection board, and the resilient parts are disposed between the upper connection board and the lower connection board, so that the upper connection board and the lower connection board are capable of approaching each other by the guiding columns to compress the resilient parts.

14. The press-fit assembly apparatus of claim 13, wherein the first roller has a circumferential surface and a radial sidewall surface, and when the first roller rolls the second frame, the circumferential surface rolling touches the second frame, and the radial sidewall surface urges against a side surface of the second frame.

15. The press-fit assembly apparatus of claim 14, wherein the first roller has a curve or L-shaped sectional profile matching a surface profile of the second frame corresponding to the second engagement portion.

16. The press-fit assembly apparatus of claim 15, wherein the base comprises a platform and a fixture, the platform has a first positioning structure, the fixture a second positioning structure, the first positioning structure matches the second positioning structure, the fixture is detachably disposed on the platform by matching the first positioning structure with the second positioning structure, the fixture has an accommodating structure, the accommodating structure matches a profile of the first frame, and the fixture carries the first frame by the accommodating structure.

17. The press-fit assembly apparatus of claim 1, wherein the first roller has a circumferential surface and a radial sidewall surface, and when the first roller rolls the second frame, the circumferential surface rolling touches the second frame, and the radial sidewall surface urges against a side surface of the second frame.

18. The press-fit assembly apparatus of claim 17, wherein the first roller has a curve or L-shaped sectional profile matching a surface profile of the second frame corresponding to the second engagement portion.

19. The press-fit assembly apparatus of claim 1, wherein the first roller has a curve or L-shaped sectional profile matching a surface profile of the second frame corresponding to the second engagement portion.

20. The press-fit assembly apparatus of claim 1, wherein the base comprises a platform and a fixture, the platform has a first positioning structure, the fixture a second positioning structure, the first positioning structure matches the second positioning structure, the fixture is detachably disposed on the platform by matching the first positioning structure with the second positioning structure, the fixture has an accommodating structure, the accommodating structure matches a profile of the first frame, and the fixture carries the first frame by the accommodating structure.

* * * * *